S. B. COX.
Lamp Stove.
No. 68,608.                           Patented Sept. 10, 1867.
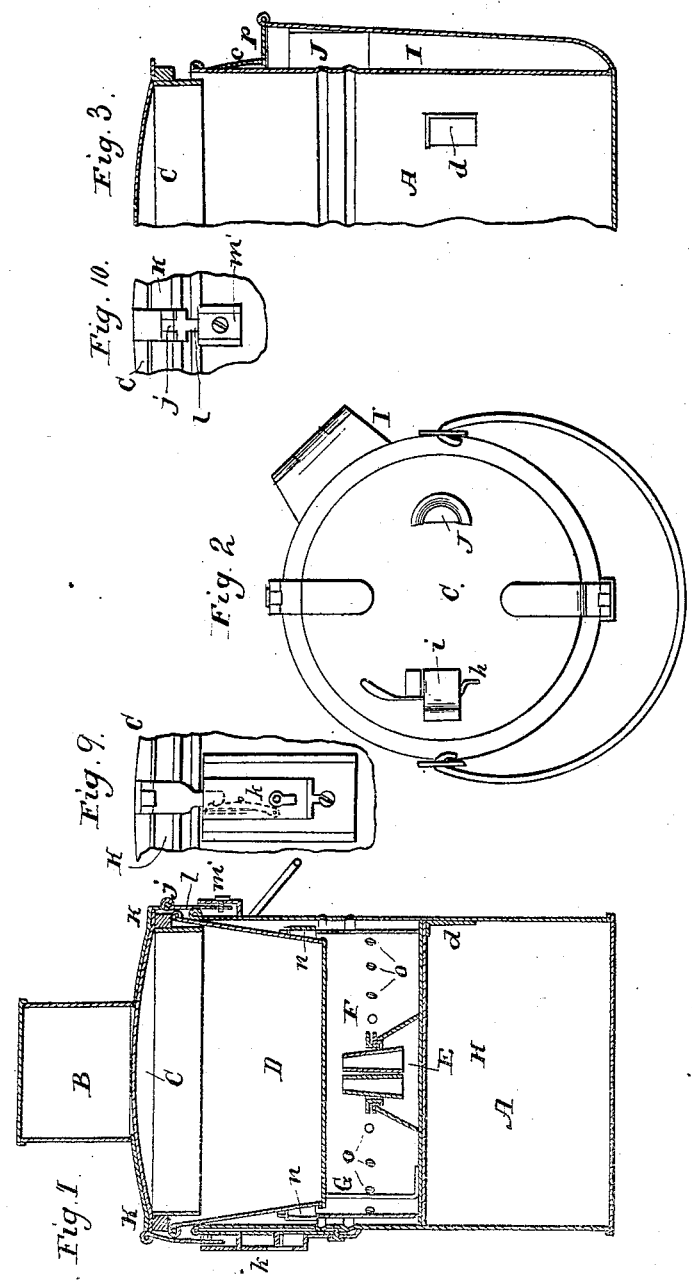

United States Patent Office.

SAMUEL B. COX, OF BUFFALO, NEW YORK.

Letters Patent No. 68,608, dated September 10, 1867.

---

IMPROVED DINNER-PAIL.

---

The Schedule referred to in these Letters Patent and making part of the same.

---

TO ALL WHOM IT MAY CONCERN:

Be it known that I, SAMUEL B. COX, of the city of Buffalo, county of Erie, and State of New York, have invented certain new and useful improvements in Dinner-Pails; and I do hereby declare that the following is a full, clear, and exact description thereof, reference being had to the accompanying drawings, and to the letters of reference marked thereon.

The object of my invention is the production of a receptacle or vessel to be used to carry dinners or lunches in, and particularly adapted for the use of workmen who leave their homes in the morning to be absent all the day, though wherever it is desired to carry small quantities of prepared food, the said receptacle or vessel may be used with advantage.

My invention consists in the combination with and adaptation to a common tin pail, such as workmen use for dinner-pails, properly modified in construction to receive them, of certain devices and additional parts which render said pail more convenient and effectual for the purposes for which it is designed. In the accompanying drawings—

Figure 1 is a vertical central section of my improved dinner-pail.

Figure 2 is a top view of the same, the small drinking-cup being removed from the top thereof.

Figure 3 is a vertical radial section in detail through the box or receptacle on the side of the pail, in which the knife, fork, and matches may be carried.

Figure 4 is a match-box to be carried in said receptacle.

Figure 5 is a bottom view of the inner cup or vessel for containing the liquid food which it is intended to warm.

Figure 6 is a side elevation of the lamp for warming the said liquid food, with a fender around it, and two supports secured to its bottom, on the inside, to support the cup while the food is being warmed; the side of the fender being broken away to expose the lamp and one of the supports.

Figure 7 is a top view of an extra cover to be put over the cup containing the liquid food while it is being warmed.

Figure 8 is a top view of the small drinking-cup which is carried on the top of the pail.

Figure 9 is a front view in detail of a lock for securing one side of the cover to the pail.

Figure 10 is a similar view of an adjustable hinge for securing the opposite side of said cover to the pail.

A is the body of the pail; B is the small drinking-cup which is carried on the top of the cover C of the pail; D is the inner cup or receptacle, in which the liquid portion of the food, as tea or coffee, is placed to be heated by the lamp E; F is the fender around the lamp, and G G are the supports on which said cup D is set for heating such food. H is the extra cover to be put over the tea or coffee while being warmed. It rests on the projections $d\ d$ when the pail is put together to be carried. I is the box or receptacle on the outside of the pail, in which the knife, fork, and spoon, and the match-box J may be carried. The last-mentioned article is secured to the side of the box I by the hook $a$ which is hooked over the side of said box. The cover $b$ of this box is secured by the spring $c$. The cup B is secured and held firmly to the cover C by means of the lug $e$, which is inserted in the socket $f$, and the projection $g$, which locks into the spring-catch $h$ under the plate. The liquid food, which is carried in the cup D, is kept from slopping or spilling out between the cup D and the cover C by means of the grooved India-rubber ring K; the said cover and rubber ring being held firmly down against the said cup by the adjustable hinge $j$ and lock $k$. The hinge $j$ may be so adjusted as to produce a greater or less pressure upon the grooved rubber ring K by means of the sliding tongue $l$ and screw $m$; the said screw being used to secure the said tongue at any desired height, the screw sliding in a slot for that purpose.

When it is desired to heat the liquid contents of the cup D, the said cup and lamp E are removed from the pail, the lamp lighted, and the cup set upon the supports G G, the upper ends of which enter the sockets $n\ n$ made to receive them on the cup D. The cover H is then put over the cup D to retain the heat and prevent the dust from entering, while the fender F prevents the wind from blowing out the lamp or dispersing the heat. Suitable holes $o\ o$ are made in this fender to admit air for the support of combustion. A button or thumb-piece, $p$, is set into a sunken place in the cover H for convenience in handling it.

The advantages which my invention possesses over others are, first, by the combination of the grooved rubber ring K with the cover C and cup D the fluid contained is effectually prevented from spilling and moistening the rest of the food; second, by the combination with the said grooved rubber ring K, cup D, and cover C of the adjustable hinge $j$ and spring-catch $i$, the joint formed at the junction of the said grooved rubber ring and cup D may at all times be kept quite tight; third, by means of the fastenings, by which the cup B is secured to the cover C, the said cup is held much more securely in place than by the old method, while the danger of its becoming jammed and sticking is entirely removed; fourth, by the combination with the pail A and cup D of the lamp E a ready means is furnished for heating the liquid food or beverage which is carried in the cup D; fifth, by the combination of the fender F, supports G G, and sockets $n$ $n$ with the lamp E and cup D, the lamp is kept from being blown out by the wind, the heat is economized, and the apparatus needs little or no attention while the process of heating is going on; sixth, by the combination with the cup D of the lamp E and cover H the heat is still further economized, and the article heated is protected from the dust; seventh, by the combination with the box I of the cover $b$ and spring $c$ the articles contained in the box I are effectually prevented from falling out and becoming lost.

I claim as my invention—

1. The combination, with the cover C and cup D, of the grooved India-rubber ring K, the adjustable hinge $j$, and spring-catch $k$, substantially as and for the purpose set forth 2. The combination, with the pail A and cup B, of the lugs or projections $e$ and $g$, the socket $f$, and spring-catch $h$, substantially as hereinabove set forth.

3. The combination, with the cup D and lamp E, of the fender F, supports G G, and sockets $n$ $n$, substantially as set forth.

4. The combination, with the box I, of the cover $b$ and spring $c$, substantially as and for the purpose set forth.

S. B. COX.

Witnesses:
GEO. H. LAWRENCE,
THOMAS JAMES, Jr.